United States Patent [19]
Wogerer

[11] 3,822,107
[45] July 2, 1974

[54] IMPROVEMENTS IN OR RELATING TO AN INJECTION MOLD

[75] Inventor: Alfred Wogerer, Schwertberg, Austria

[73] Assignee: Ludwig Engel K.G. Maschinenfabrik, Schwertberg, Austria

[22] Filed: Dec. 20, 1972

[21] Appl. No.: 316,697

Related U.S. Application Data

[62] Division of Ser. No. 91,329, Nov. 20, 1970, abandoned.

[52] U.S. Cl. .......................... 425/130, 264/245
[51] Int. Cl. ............................................ B29c 9/00
[58] Field of Search ...... 425/130, 120, 438, DIG. 9, 425/246; 264/245, 247, 250

[56] References Cited
UNITED STATES PATENTS

| | | | |
|---|---|---|---|
| 2,241,180 | 5/1941 | Burke | 264/245 |
| 2,815,033 | 12/1957 | Braunlich | 264/245 X |
| 3,016,579 | 1/1962 | Schlitzkus | 264/247 |
| 3,086,249 | 4/1963 | Nelson | 264/250 X |
| 3,164,864 | 1/1965 | Kobayashi | 264/250 X |
| 3,339,240 | 9/1967 | Corbett | 425/130 |
| 3,443,005 | 5/1969 | Braun | 264/245 |
| 3,599,290 | 8/1971 | Garner | 425/130 |
| 3,751,200 | 8/1973 | Borisuck et al. | 425/120 X |

*Primary Examiner*—J. Spencer Overholser
*Assistant Examiner*—John S. Brown
*Attorney, Agent, or Firm*—Wenderoth, Lind & Ponack

[57] ABSTRACT

An injection molding apparatus includes a first and a second nozzle connected to a two part mold having a first and second chamber. A molding compound may be injected into one chamber by the first nozzle. The molded piece is maintained constantly in connection with one of the parts. The second chamber is closed during the injection from the first nozzle by movable means against access of the molding compound. The mold part after the first injection has been finished through the first nozzle is exchanged and the second chamber is filled by the second nozzle after changing the position of the movable means.

5 Claims, 2 Drawing Figures

ALFRED WÖGERER,
INVENTOR

IMPROVEMENTS IN OR RELATING TO AN INJECTION MOLD

This is a division of application Ser. No. 91,329 filed Nov. 20, 1970 and now abandoned.

BACKGROUND OF THE INVENTION

This invention relates to an injection mold where the molded piece is constantly connected with an injection mold part into which open at least two nozzles. The first injection operation is effected by a first nozzle whereas a chamber connected with a second nozzle is closed by movable pins which limit the access of the injection molding compound. The position of the pins then changes and the chamber earlier closed by the pins is filled by the second nozzle.

A system has been known (German Pat. No. 885,152) wherein a pin is shifted within a closed mold in order to open the injection opening of a second nozzle and to create a cavity into which the material of this second nozzle can be injected. By this system only very simple, two-colored objects can be produced. In particular it is practically impossible to extensively coat the molded piece produced by the first nozzle. In order to reach this effect it has already been suggested to use two injection mold parts, each one provided with a nozzle. In such case the molded piece receives a first coating by the first nozzle, whereupon it is swivelled along with an ejection mold part to a second injection mold part where it is finished.

OBJECTS AND BRIEF DESCRIPTION OF THE INVENTION

The object of present invention is to provide a system wherein the molded piece is constantly connected with an injection mold part, the ejection mold part being exchangeable after injection by the first nozzle has been finished.

Preferably the change in the interior space of the mold taking place between the first and the second injection phases can be obtained not only by exchanging the ejection mold parts but additionally by removing inserts or by taking out slide plates from the mold. Exchange of the ejection mold parts may be performed, for example, by a turning or a sliding table.

The advantages of the device according to the invention are particularly obvious when complicated formed injected articles, e.g. lettered keys, marked labels etc., are produced. Such advantages will therefore be discussed in connection with the application of the present invention. At present, typewriter keys are coated from the outside, thus necessitating a costly removal of the sprue rests. A disadvantage results, moreover, in that the major part of the outside of the key is finished during the first injection phase, since in the second phase the usual symbols made of a material of a different color are merely added to the key proper. This necessitates exact processing of the surface of the first injection mold part since it determined the external outlines of the key. With the exception of the symbol outlines the second injection mold part must be identical with the first one or damage to the half-finished keys would result.

The invention enables for the first time the production of typewriter keys and of other objects with two-colored front sides, whereby pin point gating is used at the rear side. Preferably, the tracing of the front side will be made first and afterwards the surrounding parts will be formed. If it is intended to obtain on the surface of the produced object, areas of a second molding compound to form a composite article, inserts which must be placed in the mold during the first injection process are provided. After the removal of the inserts the injection molding compound injected during the second phase can penetrate through the channels originally filled with the inserts into the chamber enclosed by the injection molding compound first injected which has solidified.

Further details of the invention will be specified hereinafter with reference to the accompanying drawings showing an embodiment of an injection mold according to the invention.

DETAILED DESCRIPTION OF THE INVENTION

At the side where injection is effected the injection mold of the present invention is provided with two nozzles 1 and 2 for injecting differently colored injection molding compounds through the wall of a fixed mold part 3. At the rear side the interior of the mold is limited by a stripper plate 4, by means of which the molded pieces produced in the mold can be stripped off into a suitable sorting device.

Figure 1:
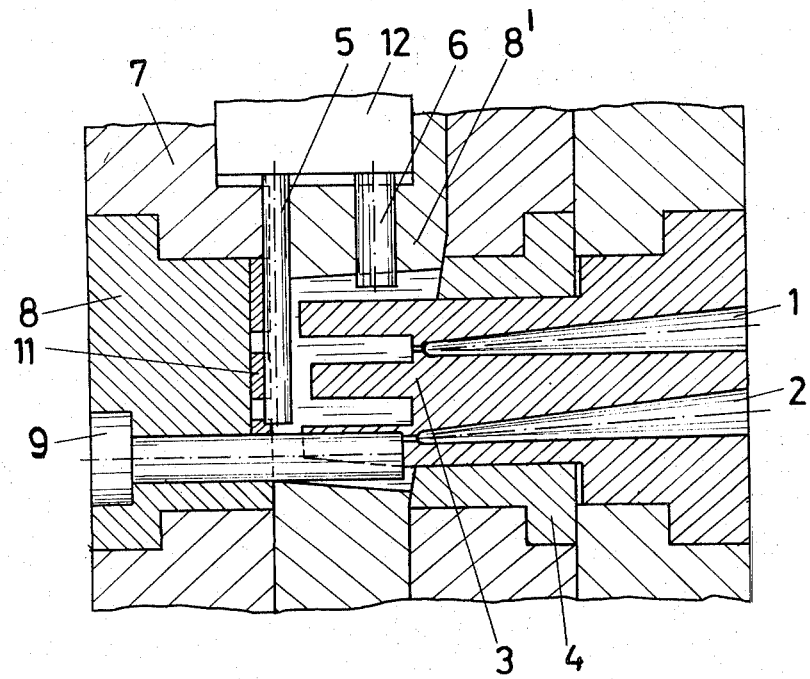
FIGS. 1 and 2 show longitudinal cross sections of an injection mold, FIG. 1 showing the condition at the beginning of a first process step and FIG. 2 the condition at the beginning of a second process step.
Figure 2:
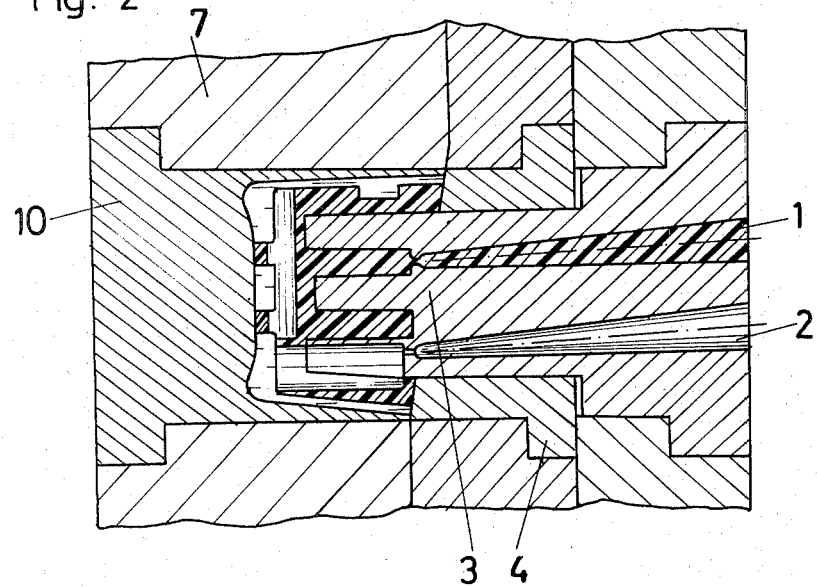

In FIG. 1 the fixed injection mold part 3 is enclosed by a first movable ejection mold part intended to be used in the first injection phase. A separating wall extends between parts 8 and 8' of the first movable injection mold part, and is provided with an engraved exchangeable insert 11. The mold parts 8 and 8' are supported by a plate 7 connected to a turning or sliding table.

When typewriter keys are produced by the specified injection mold, plastic is first injected through the nozzle 1 into the interior of the mold. The exit of nozzle 2 is closed by a pin 9 which may also be connected with or laterally inserted in the mold parts 8, 8'. It is essential that the pin 9 extends up to the end of the molding space so that the molded piece produced during the first process phase can be re-molded during the second process phase. Pin 5 is employed to keep part of the interior of the mold free of the first injection molding compound in order to allow an injection molding compound of a different color to penetrate into the space surrounded by a closed letter in the second process phase. Pin 6 serves to produce a recess within the molded piece produced during the first process phase. During the second phase the other material penetrates into such recess, mutual adhesion of the different colored parts of the final product thus being improved. Injection through nozzle 1 being finished, the pins 5 and 6 are pulled out by means of the slide plate 12 and the mold is opened as far as is necessary to enable entry of a second movable ejection mold part 10. The molded piece remains on the mold part 3 during this process.

When the mold has been closed again, the nozzle 2 comes into operation and the half-finished molded piece is coated with plastic material of a different color, whereby the symbol engraved on the insert 11 remains visible only at the front side of the key.

By means of the stripper plate 4 the finished keys are stripped into a sorting device. That is the apparatus is opened as far as is necessary to eject the molded pieces in a tear-off-process known per se. As the molded pieces are removed only once, complete opening of the apparatus is necessary only once during the whole process of production.

Since the inner part of the key is injected first, and thus has relatively ample time for cooling, precision of the formation of the keys is very well guaranteed.

By use of the present invention it will be possible to place a great number of typewriter keys or calculating machine keys or the like into one form. Injecting all of the 46 standarized typewriter keys in one mold is, therefore, no problem at all. The change-over between different types requires only exchange of the engraved inserts 11.

I claim:

1. A two part injection mold for producing typewriter keys formed of at least two separate materials and with a first side surface formed of each of said materials and a second side, said mold comprising:

a fixed ejection mold part having a first end and a second end;

a first movable ejection mold part positionable to surround said first end of said fixed ejection mold part, thus forming a first chamber therebetween;

at least two injection nozzles extending through said fixed ejection mold part from said second end thereof into said first chamber;

first selectively retractable means extending through said first movable ejection mold part for isolating all but a first of said injection nozzles from said first chamber;

second selectively retractable means extending through said first movable mold part for forming recessed portions in the partially molded piece resulting from the injection of a first of said materials through said first injection nozzle into said first chamber;

a second movable ejection mold part positionable to surround said fixed ejection mold part and said partially molded piece, thus forming a second chamber therebetween, said second chamber being isolated from said first injection nozzle by said partially molded piece, and said second chamber being in communication with a second of said injection nozzles, whereby when a second of said materials is injected through said second injection nozzle into said second chamber said composite article is formed; and said first movable ejection mold part being movable away from the position thereof surrounding said first end of said fixed ejection mold part to allow said second movable ejection mold part to be positioned to surround said fixed ejection mold part and said partially molded piece.

2. A mold as claimed in claim 1, wherein said at least two separate materials are two separate materials, and said at least two injection nozzles are two injection nozzles.

3. A mold as claimed in claim 2, further comprising interchangeable engraved insert means attachable to the inner surface of said first movable injection mold part for forming a raised portion on said partially molded piece which forms a symbol on said first side surface of said composite article.

4. A mold as claimed in claim 2, wherein said first selectively retractable means comprises movable pin means.

5. A mold as claimed in claim 2, wherein said second selectively retractable means comprises movable pin means.

* * * * *